United States Patent
Plache et al.

(10) Patent No.: US 11,231,690 B2
(45) Date of Patent: Jan. 25, 2022

(54) SYSTEM AND METHOD FOR DYNAMIC META-DATA IN CONTROL AND VISUALIZATION

(71) Applicant: ROCKWELL AUTOMATION TECHNOLOGIES, INC., Mayfield Heights, OH (US)

(72) Inventors: Kenneth S. Plache, Scottsdale, AZ (US); Michael D. Kalan, Highland Heights, OH (US); Keith M. Hogan, Painesville, OH (US); Christopher E. Stanek, Willoughby, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 15/675,190

(22) Filed: Aug. 11, 2017

(65) Prior Publication Data
US 2017/0336772 A1   Nov. 23, 2017

Related U.S. Application Data

(63) Continuation of application No. 13/654,061, filed on Oct. 17, 2012, now abandoned.

(60) Provisional application No. 61/560,508, filed on Nov. 16, 2011, provisional application No. 61/558,995, filed on Nov. 11, 2011.

(51) Int. Cl.
*G05B 19/042* (2006.01)
*G05B 19/418* (2006.01)

(52) U.S. Cl.
CPC ..... *G05B 19/0423* (2013.01); *G05B 19/4183* (2013.01); *Y02P 90/02* (2015.11)

(58) Field of Classification Search
None
See application file for complete search history.

(56) References Cited

U.S. PATENT DOCUMENTS

| | | |
|---|---|---|
| 2001/0031066 A1 | 10/2001 | Meyer et al. |
| 2002/0168082 A1 | 11/2002 | Razdan |
| 2003/0105811 A1 | 6/2003 | Laborde et al. |
| 2007/0113287 A1 | 5/2007 | Blumenau et al. |
| 2007/0142941 A1 | 6/2007 | McGreevy et al. |
| 2008/0183976 A1 | 7/2008 | Bliss et al. |
| 2008/0288547 A1 | 11/2008 | Brodsky et al. |
| 2009/0106741 A1* | 4/2009 | Dageville ........... G06F 11/3636 717/128 |
| 2010/0083226 A1 | 4/2010 | Kowal |
| 2010/0153771 A1 | 6/2010 | Gordon et al. |
| 2011/0153836 A1 | 6/2011 | Ireland |
| 2011/0161942 A1 | 6/2011 | Brunswig et al. |

* cited by examiner

*Primary Examiner* — Tony Mahmoudi
*Assistant Examiner* — Umar Mian
(74) *Attorney, Agent, or Firm* — Fletcher Yoder, P.C.

(57) ABSTRACT

An automation control and monitoring system is provided that includes an automation control component and a data store. The automation control component is configured to store measurement data acquired from a sensing component of the automation control system. Metadata is dynamically associated with the measurement data, such that at least a portion of both the data and the metadata may be accessed using a name reference that provides an indication of particular data from the one or more data fields and particular metadata associated with the particular data.

17 Claims, 8 Drawing Sheets

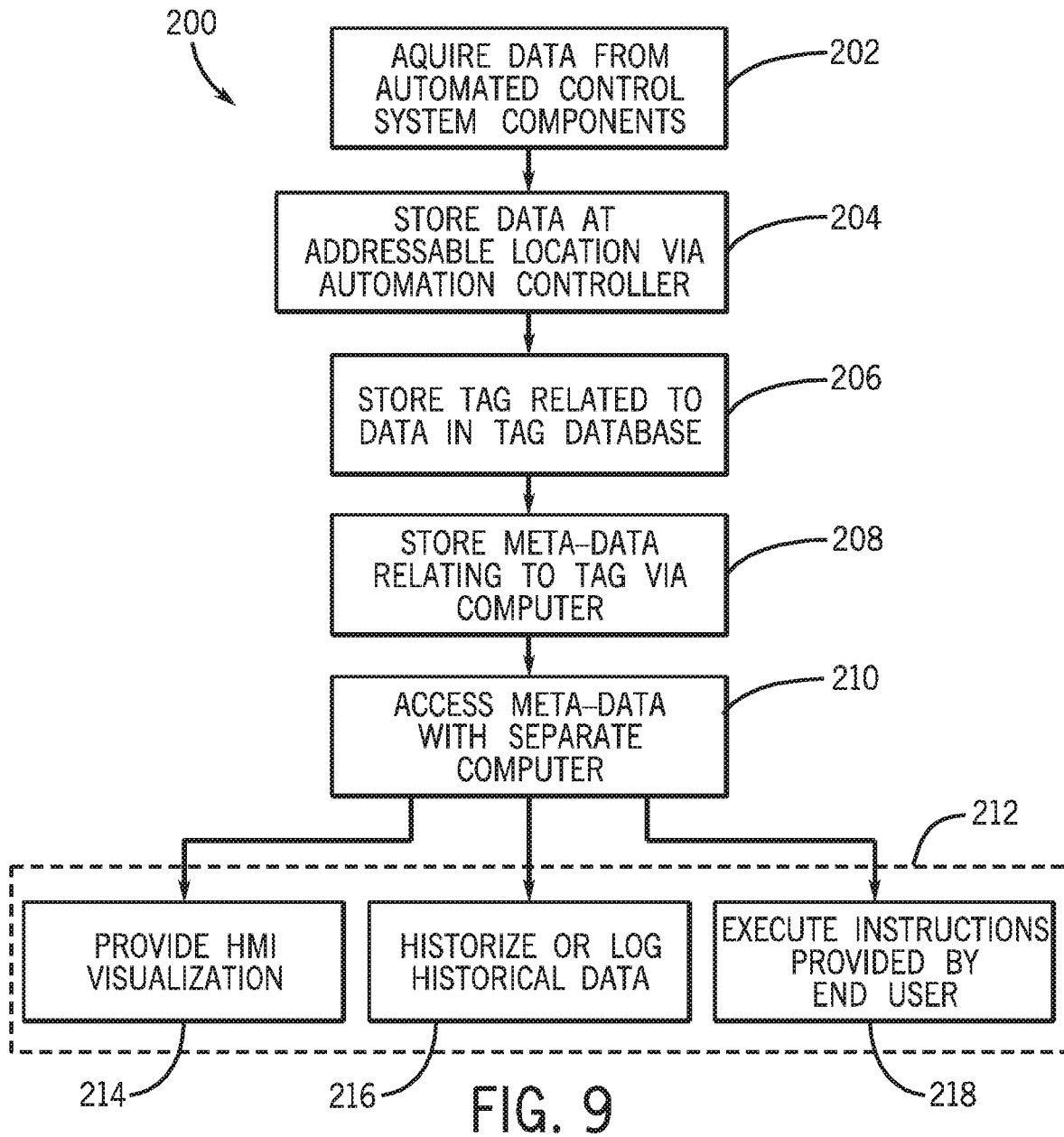

SYSTEM AND METHOD FOR DYNAMIC META-DATA IN CONTROL AND VISUALIZATION

CROSS REFERENCE TO RELATED APPLICATIONS

This application is a continuation of U.S. Non-Provisional patent application Ser. No. 13/654,061 entitled System and Method for Dynamic Meta-Data in Control and Visualization, filed Oct. 17, 2012 which is a Non Provisional of U.S. Provisional Patent Application No. 61/558,999, entitled "Control System Meta-Data", filed Nov. 11, 2011, and of U.S. Provisional Patent Application No. 61/560,508, entitled "Control System Meta-Data", filed Nov. 16, 2011, each of which are herein incorporated by reference.

BACKGROUND

Embodiments of the present disclosure relate generally to the field of automation control and monitoring systems. More particularly, embodiments of the present disclosure relate to utilization of data structures in interfacing with automation control and monitoring systems.

A wide range of applications exist for automation control and monitoring systems, particularly in industrial settings. Such applications may include the powering of a wide range of actuators, such as valves, electric motors, and so forth, and the collection of data via sensors. Typical automation control and monitoring systems may include one or more components, such as: programming terminals, automation controllers, input/output (I/O) modules, and/or human-machine interface (HMI) terminals.

The human machine interfaces or "HMIs" are commonly employed for monitoring or controlling various processes. HMIs may be employed in numerous different settings, such as in automobiles, aircraft, commercial settings, and a host of other applications. The HMIs may read from or write to specific registers such that they can reflect the operating state of various machines, sensors, processes, and so forth. The HMIs can also write to registers and memories such that they can, to some extent, control the functions of the process. In monitoring functions alone, little or no actual control is executed.

HMIs or interfaces of an automation control system typically employ objects, which are software components that may include an accessible or configurable element in a software environment. For example, objects may include self-sufficient programs that can be run as quasi-independent elements. Objects may also be referred to as device elements. Objects used in an interface may correlate to different controls, monitors, or any other parameter of an industrial automation device. Such objects may be particular instances of a general object type stored in the interface. Some of these objects may have visual representations on the interface devices, while other objects may not be visually represented but may be accessible for configuration and programming by a user. A user may desire to manipulate these objects, such as by creating new objects, copying objects, editing objects, etc., to create and customize an interface. It is now recognized that improved interaction with such objects, via the automation control system, is desirable.

BRIEF DESCRIPTION

In accordance with one aspect of the disclosure, an automation control and monitoring system includes an automation control component and a data store. The automation control component is configured to store measurement data acquired from a sensing component of the automation control system in onboard memory in a manner defined by a data structure of the measurement data. The data store is configured to store and dynamically associate meta-data with the measurement data acquired from the sensing component such that the meta-data extends (virtually but not necessarily physically) the data structure by linking at least portions of the meta-data with the measurement data.

In accordance with another aspect of the disclosure, a tangible, non-transitory, computer-readable medium includes machine-readable instructions to obtain data from a component of an automation control and monitoring system and to store the data in a defined data structure of an automation controller. The tangible, non-transitory, computer-readable medium also includes machine-readable instructions to obtain additional meta-data relating to the data and to store and associate the additional meta-data in a data store. The additional meta-data is not stored in the defined data structure.

Present embodiments also provide a method that includes acquiring data from components of an automated control and monitoring system. The method also includes storing the acquired data at an addressable location via an automation controller of the automated control and monitoring system. In addition, the method includes storing a tag related to the acquired data in a tag database, wherein the tag comprises the addressable location and a tag identifier. Further, the method includes generating meta-data relating to the tag via a computer, wherein the tag does not comprise the meta-data.

DRAWINGS

These and other features, aspects, and advantages of the present invention will become better understood when the following detailed description is read with reference to the accompanying drawings in which like characters represent like parts throughout the drawings, wherein:

FIG. 9 is a process flow diagram of a method in accordance with an embodiment of the present techniques.

DETAILED DESCRIPTION

Traditional automation control and monitoring systems have a static or rigid definition of the types of objects that are supported, with little or no flexibility to dynamically enhance those types after product release. For example, an automation control and monitoring system may support an object type with a tag that has a "name", "type", "description" and "value". However, it is now recognized that it may be difficult to manage and associate additional information with the tag as more automation components integrate with the automation control and monitoring system. For example, a user may desire to associate additional data with an object when the originally created object type does not have a structure to support this additional data. As the automation control and monitoring system is unable to manage the additional information, it may be forced into mirroring tags, and adding the additional information to the mirrored tags. This may lead to additional user work to create and maintain consistency of these mirrored tags as the control/monitoring components evolve over further development, commissioning, and maintenance of the system. In addition, the system may include a large number of tags needing additional data, which may take the user a long time to configure individually.

Present embodiments are directed to dynamically extending and managing property sets for objects in automation control and monitoring systems. Systems and methods are provided for storing measurement data detected from a sensing component of an automation control and monitoring system and dynamically associating additional data, or meta-data, with the measurement data. Such meta-data may include properties relating to the measurement data, such as a minimum value, a maximum value, engineering units, description, etc. The measurement data is stored according to a rigid data structure, and the meta-data may be stored in a data store and dynamically linked with the measurement data to virtually extend this data structure. Components of the control and monitoring system may use different pieces of meta-data associated with the measurement data, and may implement software that stores the meta-data where it will be used. The meta-data may be configured and associated with objects in an automation controller via a programming terminal. Once linked with the appropriate measurement data, the meta-data may be communicated to a human machine interface (HMI), or other component, for storage, analysis, historization of the measurement data, and/or generating visualization graphics related to the measurement data. The use of dynamic meta-data in control and monitoring systems may enable pass-through capabilities, allowing the meta-data to be linked to related objects in an HMI without the separate configuration of each object.

Figure 1:
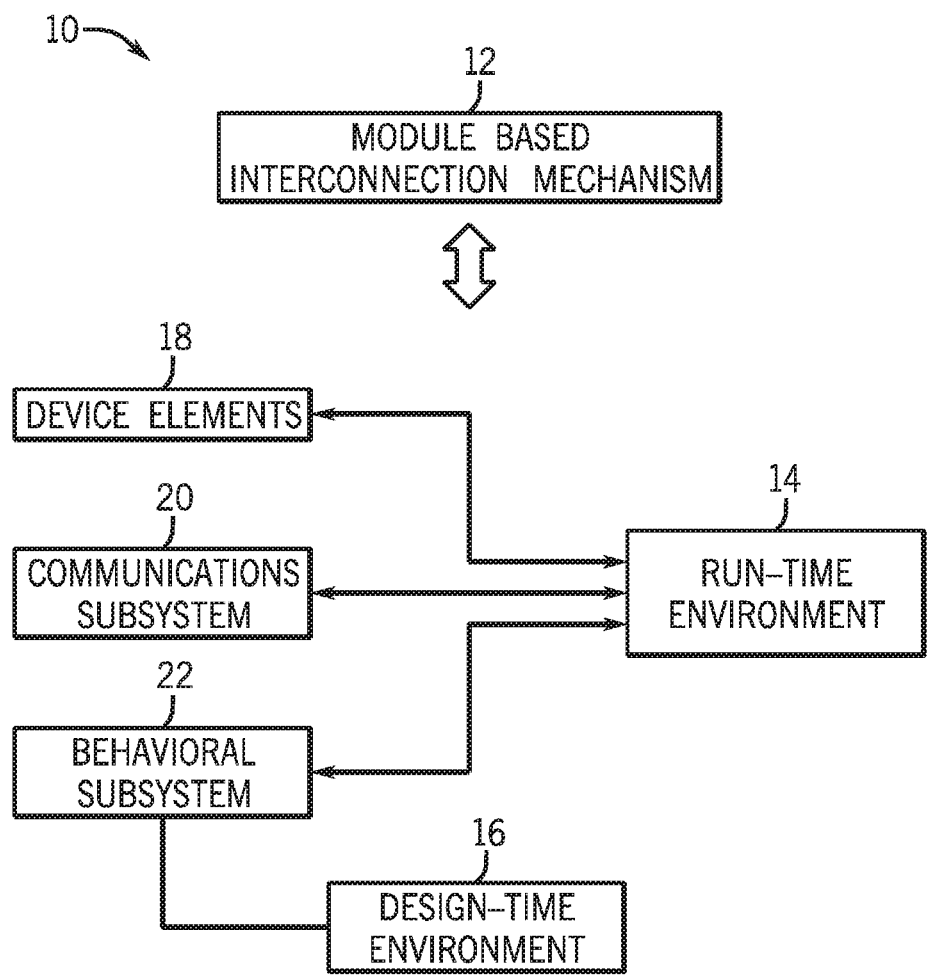
FIG. 1 is a general overview of a framework for portions of an automation control and monitoring system in accordance with certain aspects of the present techniques.

A number of facets, components and processes will be described through the following discussion. By way of introduction, a general system overview is in order that situates these features in context. FIG. 1 is a diagrammatical representation of a control and monitoring software framework 10 for an interface in accordance with an embodiment of the present disclosure. The framework 10 facilitates building functional software by utilizing a module based interconnection mechanism 12, which inherently supports dynamic manipulation and configuration. This dynamic manipulation and configuration ability facilitates efficient provision of feature-rich configuration environments for configurable interfaces. That is, as described below, individual device elements are provided as stand-alone code that can be individually programmed, pre-written for use, as in a library, customized in their function and appearance in screens, and interconnected to provide information to a user as well as control and monitoring functions.

The framework 10 includes two interrelated software environments that may reside on a single system (e.g., computer). Specifically, a run-time environment 14 enables an operator (e.g., a human user) to interact with an application, such as a process during run-time (e.g., during use of the interface, typically during interaction with or observance of a process in operation). A design-time environment 16 permits a designer to configure the interface and its components. For example, a system may graphically present run-time information to an operator via the run-time environment 14 on a display (e.g., computer or interface device screen). Further, the system may include means (e.g., a keypad) for accepting operator input that can be detected and managed via the run-time environment 14.

The run-time environment 14 includes or provides access to device elements 18. The device elements 18 are software components that may include any accessible or configurable element in a software environment. For example, the device elements 18 include software components, such as "ActiveX" controls or ".NET" components that are managed by the run-time environment 14. "ActiveX" and ".NET" refer to object-oriented concepts, technologies and tools. Those skilled in the art will be well-acquainted with such programming approaches generally. In the present context, such standards should be taken as merely examples, and "device elements" should be understood as including any generally similar components or self-sufficient programs that can be run as quasi-independent elements, sometimes referred to as "objects". Throughout the following discussion, the terms "device elements" or "objects" may be used interchangeably. Other standards and platforms exist for such elements, typically championed by different companies or industry groups.

Because such device elements are basic to certain of the concepts set forth herein, a few words of introduction are in order. Device elements generally include four features: properties, methods, connections (or connection points) and communications interfaces. Properties, in this context, are attributes that can be adjusted, such as to define an image or representation of the element in a screen view, as well as its location on the screen, and so forth. In this context, a method is an executable function (sometimes referred to herein as the elements "functionality" or "state engine"), and defines an operation performed by execution of the element. A connection, in this context, is a link between elements, and can be used to cause data (read from a memory or written to a memory) to be sent to another element.

Specific examples of device elements 18 may include software pushbuttons, timers, gauges, PLC communication servers, visualizations (such as screens that illustrate state of components within the automation control and monitoring system), and applications. In general, virtually any identifiable function may be configured as such an element. Moreover, as discussed below, such elements may communicate with one another to perform a wide range of display, monitoring operations and control functions. It should be noted that device elements 18 do not require special limitations for supporting a design mode. Also, while elements associated with an image are quite useful, particularly for visualizations, many elements may not have a visual representation, but may perform functions within an HMI, such as calculations, or even management and data exchange between other elements.

The run-time environment 14 typically operates using a communications subsystem 20. The communications subsystem 20 is adapted to interconnect the device elements 18. In practice, the communications subsystem 20 may be thought of as including the connections of the device elements 18. However, it may include a range of software, hardware and firmware that send data to and receive data from external circuits, such as automation controllers, other computers, networks, satellites, sensors, actuators, and so forth.

The run-time environment 14 typically operates using a behavioral subsystem 22, which is adapted to manage the behavior of the device elements 18. For example, responsibilities of the behavioral subsystem 22 may include the following: place and move device elements, modify device elements, group device elements on interchangeable screens, save and restore screen layouts, manage security, save and restore connection lists, and supply remote access to the run-time environment 14. Here again, in practice, such behaviors may be defined as part of the profile (i.e., the "method" or "state engine") of each device element.

In presently disclosed embodiments, the design-time environment 16 may be used to configured the device elements 18 through various thick-client, thin-client, or Web-based implementations. For example, the design-time environment 16 may be implemented on a networked computer workstation or thin-client device that directly accesses the device elements 18 from a server. Such devices may then allow a designer to perform reconfigurations of the device elements 18 used in the run-time environment 14 when an interface is not operating. In some embodiments, the design-time environment 16 may include an advanced implementation of the behavioral subsystem 22 that facilitates direct or indirect manipulation of the run-time environment 14, without impeding or compromising the behavior of the run-time environment 14. That is, design and reconfiguration of the device elements 18 can be done even while an interface is operating. The behavioral subsystem 22 extends access to the run-time environment 14 via remote provision of the design-time environment 16, such as in a conventional browser. The behavioral subsystem 22 allows a designer to interact with and change aspects of the run-time environment 14 of an HMI via a remote programming terminal by serving the design-time environment 16 or aspects thereof to the programming terminal from the HMI. For example, an HMI coupled to a laptop via a network may provide a user with configuration capabilities by serving up a specific design-time environment 16 to the laptop via the network.

Details and examples of how this may be done are provided below. In current embodiments, the design-time environment 16 may be a product of combining Dynamic Hypertext Markup Language (DHTML) and an Active Server Page (ASP) server scripting to serve dynamic content to a browser. An ASP script is specially written code that includes one or more scripts (i.e., small embedded programs) that are processed on a server (e.g., Web server) before the page is sent to a user. Typically, in conventional usage, such script prompts a server to access data from a database and to make a change in the database. Next, the script typically builds or customizes the page before sending it to the requestor. As discussed below, such scripting is used in the present framework quite differently, such as to build visualizations without prior knowledge of either the functionality of device elements, or their interrelationships.

By facilitating changes to device elements, the design-time environment 16 allows the designer to make interchangeable design-time models or specialized implementations of the behavioral subsystem 22. A specific example of a design-time implementation of the behavioral subsystem 22 includes a Web-based design-time environment 16, which extends access to a run-time environment 14 on an HMI via a TCP/IP connection between the HMI and a remote device. The Web-based design-time environment 16 facilitates management of the device elements without compromising run-time performance or security. In one specialized implementation the behavioral subsystem 22 gives designers the ability to manipulate aspects of the run-time environment 14 using a Web browser that is capable of accessing a related interface or HMI. As noted above, and as described in detail below this is achieved by using a combination of dynamic content, scripting, and configuration of the device element properties.

Figure 2:
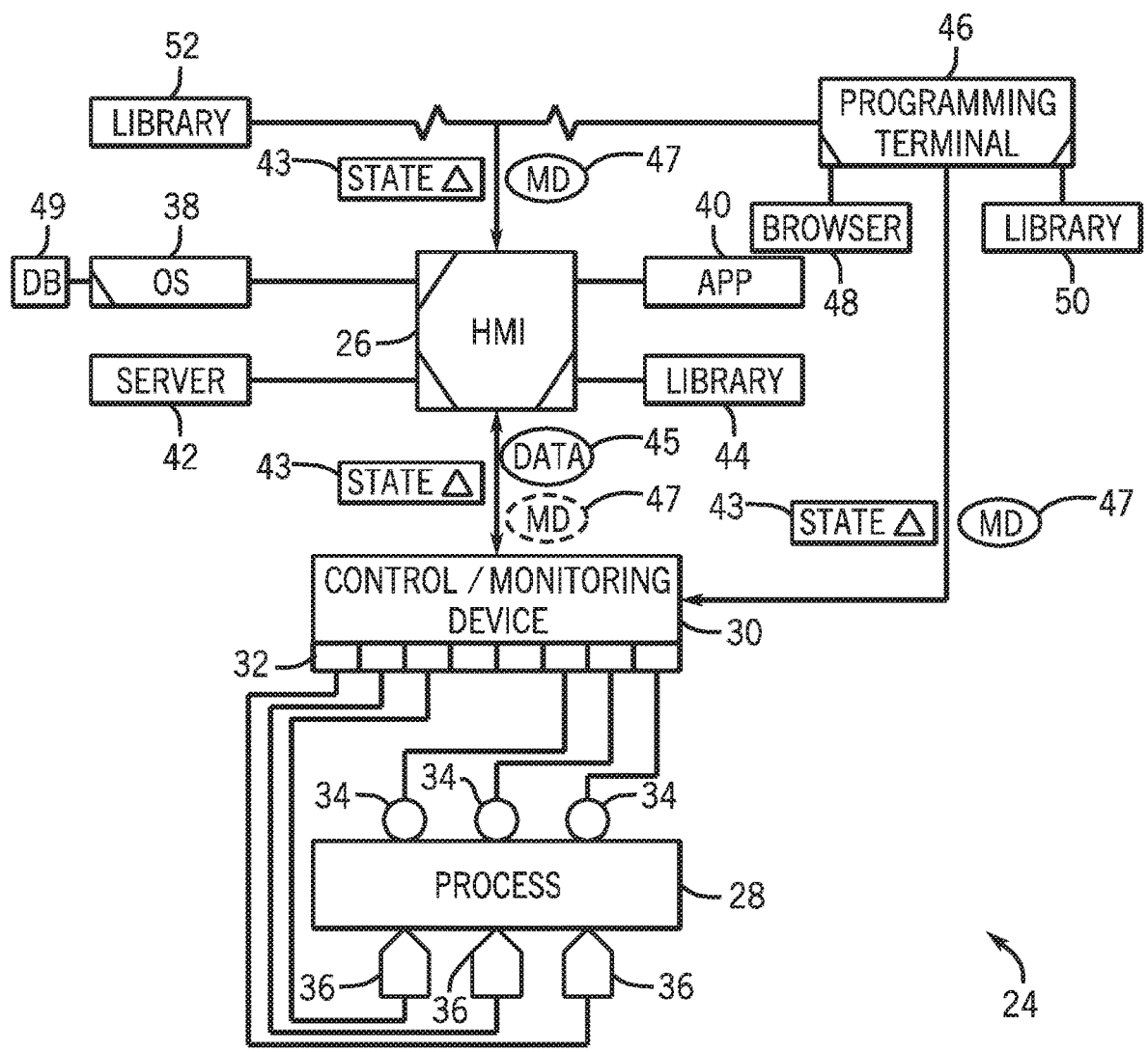
FIG. 2 is a diagrammatical overview of an automation control and monitoring system in accordance with an embodiment of the present techniques.

FIG. 2 is a diagrammatical representation of a control and monitoring system 24, such as for industrial automation, implementing the framework described above in accordance with an embodiment of the present disclosure. The system 24 includes an HMI 26 adapted to interface with networked components and configuration equipment. The system 24 is illustrated as including an HMI 26 adapted to collaborate with components of a process 28 through a control/monitoring device 30 (e.g., a remote computer, automation controller, such as a programmable logic controller (PLC), or other controller).

Collaboration between the HMI 26 and components of the process 28 may be facilitated by the use of any suitable network strategies. Indeed, an industry standard network may be employed, such as DeviceNet or Ethernet, to enable data transfer. Such networks permit the exchange of data in accordance with a predefined protocol, and may provide power for operation of networked elements. As noted above, while reference is made in the present discussion to networked (e.g., wired or wireless) systems and to systems incorporating controllers and other equipment, the HMI 26 and programming techniques described may be equally well applied to non-networked components (e.g., GPS displays, game displays, cell phone displays, tablet displays, etc.) and to networked systems outside the industrial automation field. For example, the arrangements and processes described below may be used in facilities management, automotive and vehicular interfaces, computer numeric control (CNC) machines, point of sale (POS) systems, control interfaces for commercial markets (e.g., elevators, entry systems), and so forth, to mention only a few.

The run-time or operation environment 14 constructed and managed by a corresponding behavioral subsystem, is stored on and resident in the HMI 26. For example, such a behavioral subsystem can be adapted to load the application configuration framework (e.g., 10) from a storage location, such as during initial manufacture or setup of the HMI 26. When loaded, the stored application framework may be adapted to create screens and locate user interface device elements (actual images or pictorial representations corresponding to the elements) in the screens. These applications, screens, and user interface elements are each types of device elements. As described below, the HMI 26 includes a stored application that dictates the layout and interaction of the device elements. The Web-based design-time environment 16, which is based on a run-time engine, is also loaded and resident on the HMI 26. The design-time environment 16 may be adapted to handle advanced features (e.g., security management) for both design-time and run-time environments.

The HMI 26 may be adapted to allow a user to interact with virtually any process. For example, the process 28 may comprise a compressor station, an oil refinery, a batch operation for making food items, a mechanized assembly line, and so forth. Accordingly, the process 28 may comprise a variety of operational components, such as electric motors, valves, temperature sensors, pressure sensors, or a myriad of manufacturing, processing, material handling and other applications. Further, the process 28 may comprise control and monitoring equipment for regulating process variables through automation and/or observation. In general, the process 28 may comprise sensors 34 and actuators 36. The sensors 34 may comprise any number of devices adapted to provide information regarding process conditions. The actuators 36 may similarly include any number of devices adapted to perform a mechanical action in response to an input signal.

As illustrated, these sensors 34 and actuators 36 are in communication with the control/monitoring device 30 (e.g., an automation controller) and may be assigned a particular address in the control/monitoring device 30 that is accessible by the HMI 26. The control/monitoring device 30 may be configured to store measurement data acquired from the sensors 34 in an addressable register 32 of onboard memory. Such measurement data may be stored in a manner defined by a rigid data structure, as described in detail below. In some embodiments, the sensors 34 and actuators 36 may be in direct communication with the HMI 26, such that the measurement data acquired from the sensors 34 is stored in a memory of the HMI 26 as defined by the measurement data structure. The sensors 34 and actuators 36 may be utilized to operate process equipment. Indeed, they may be utilized within process loops that are monitored and controlled by the control/monitoring device 30 and/or the HMI 26. Such a process loop may be activated based on process inputs (e.g., input from a sensor 34) or direct inputs (e.g., operator input received through the HMI 26).

The server software on the interface permits viewing of the development environment, and direct reconfiguration of the interface (particularly of the device elements and their associated appearance and functionality) without the need for special viewing or configuration software. This benefit flows from the fact that the device elements and the design-time environment itself is resident in the HMI 26, and "served up" by the HMI 26 to a browser or other general purpose viewer on a programming terminal 46. In other words, necessary support for external computer workstations (e.g., laptop and desktop computers) may be reduced or eliminated. It should be noted that reference to a "browser" for viewing and modifying configuration of the interfaces is not limited to Web browsers or to any particular browser. References to a browser are intended to be exemplary. More generally, the term "browser" is utilized herein to reference software which includes any general purpose viewer.

The HMI 26, through the programming of the device elements as described below, may be thought of as including instructions for presenting one or more screen views or visualizations, and device elements executed upon interaction with the HMI 26 by reference to the screen views (e.g., pressing a button, touching a location of a screen, and the like). The screen views and device elements may be defined by any desired software or software package. For example, the screen views and device elements may be called by or executed by an operating system 38. The device elements, as discussed above, in accordance with present embodiments, may be objects conforming to ".NET" or "ActiveX", or any other standards, or may utilize proprietary technology. The operating system itself may be based upon any suitable platform, such as Linux, Microsoft Windows, Microsoft Windows CE, Android, iOS, OS-X, etc. As referenced herein, the device elements and tools support Web services or technology for transmitting data over networks (e.g., the Internet). These device elements thus follow a set of rules regarding information sharing and are adapted for use with various scripting and programming languages, as described below. Such device elements enable provision of interactive content to outside applications such as a LAN, WAN, an intranet, an extranet, or even the World Wide Web. Accordingly, the operating system 38 and the various device elements facilitate dynamic configuration of the HMI 26 through a browser 48 by allowing configuration access (e.g., serving up) to the browser 48.

For example, such configuration access includes access for instantiation of device elements. In other words, new device elements can actually be created and implemented from the browser 48. Again, it should be noted that the browser 48 does not require actual functional access. Indeed, in one embodiment, requests via the browser 48 result in a "draw" sequence of operations based on data functionality and content of device elements in a container, thus allowing illustration of the device element representations and access to their configuration without actually serving up functional aspects. This allows for configuration via a remote workstation without necessitating technical support for the remote workstation.

In addition to the operating system 38 and device elements as described above, the HMI 26 includes an application or application layer 40. The application 40, which may itself comprise a device element, facilitates access to and acquisition of information from the various device elements of the HMI 26. In particular, the application 40 represents a first level in a multi-level device element that can be enumerated for execution. The application 40 in a practical implementation may comprise a user application in a variety of forms (e.g., XML, HTML, JSON, or proprietary). The user application is then interacted with by the user or operator, as well as by the designer.

The screen views and device elements may be described as independent executable pieces of software. In a present implementation, the screen views are defined by appropriate code written in a markup language (e.g., Hypertext Markup Language or HTML). Thus, the configuration of graphical interface screens for the HMI 26 may be performed without the use of conversion programs. Further, by programming of the device elements, the screen views may be developed directly on the HMI 26 via resident server software (designated as server 42) that makes the resident development environment available for remote access. Specifically, in one embodiment, representations of certain device elements (e.g., ActiveX controls) are served up to the browser 48 without serving up the software components themselves. Because a development or design-time environment may be accessed via a browser 48, the need to download changes to the screens and to update remote configuration software applications can be eliminated. It should be noted that this browser-based software configuration is an example of one type of software for use with the HMI 26, and the present disclosure is not limited to operation via this configuration. That is, the meta-data 47 described in present embodiments may to be applied in software schemes that are not implemented via a browser (e.g., 48).

As noted above, device elements may include functionality by which they read from or write to specific memory or registers of memory, typically in other devices (but which could also be within the HMI 26). For example, a particular function may correspond to writing to or reading from one of the addressable registers 32 of the control/monitoring device 30. In a simple case, for example, an object accesses a piece of data (e.g., a state of a component as determined by one of the sensors 34), and generates an output signal to write a value corresponding to the state of a different networked device. As will be discussed in more detail below, such state information may be communicated via state deltas 43. For example, in the embodiment depicted in FIG. 2, the control/monitoring device 30 and HMI 26 may communicate state information using state deltas 43. Further, the programming terminal 46 may communicate state information with the HMI 26 and control/monitoring device 30 using the state deltas 43. As illustrated, the state deltas 43 may communicate measurement data 45 from the memory of the control/monitoring device 30 to other devices (e.g., HMI 26 for visualization) of the control and monitoring system 24.

In presently contemplated embodiments, certain device elements or objects 18 may access the measurement data 45 obtained from the sensors 34. It may be desirable for these objects to also access meta-data 47 relating to the measurement data 45. The term "meta-data" 47 may refer to data that is external to, or not part of, the object 18 with which it is associated. That is, the meta-data 47 may be associated with the measurement data 45 without being stored in the measurement data structure. While the measurement data 45 may include live data values detected via one or more of the sensors 34, the corresponding meta-data 47 may represent additional information about the measurement data 45 to which it is applied. For example, the meta-data 47 may include data representative of a default value, a minimum value, a maximum value, or units of the measurement data 45. The meta-data 47 thus provides context for interpreting the measurement data 45 used in the control/monitoring device 30. Present embodiments of the control and monitoring system 24 may facilitate dynamic association of such meta-data 47 with the measurement data 45 in a way that extends the more rigid data structure of the measurement data 45, as described in detail below. A user may generate, via a programming terminal 46, the meta-data 47 relating to an object in the control/monitoring device that references the measurement data 45. In this way, the meta-data 47 may be associated with configured object data in the control and monitoring system 24. In other embodiments, the meta-data 47 may be linked to computed data that is stored in a defined data structure within the control/monitoring device 30. Such computed data may be computed based on the measurement data 45 acquired from the sensors 34. In some embodiments, the meta-data 47 may be associated with configuration data, such as type definition objects, as described in detail below. Such configuration data, and its associated meta-data 47, may be referenced by the control and monitoring system 24 to generate objects accessing certain pieces of referenced measurement data 45. Upon instantiation of such objects, the meta-data 47 is effectively associated with the measurement data 45. A data store of the control and monitoring system 24 may store and dynamically associate the meta-data 47 with the measurement data 45 by linking at least portions of the meta-data 47 with the measurement data 45. In certain embodiments, the meta-data 47 may be stored in an onboard memory of the control/monitoring device 30 and there dynamically associated with the measurement data 45. More specifically, the meta-data 47 may be stored in volatile memory (e.g., RAM) or non-volatile memory (e.g., FLASH) using simple data structures or a database subsystem of the control/monitoring device 30.

A user may utilize the programming terminal 46 to define and loosely associate the meta-data 47 with the measurement data 45 in the control/monitoring device 30. In some embodiments, the meta-data 47 may be maintained via object types with an extended schema, and these object types can be downloaded from a library 50. In other embodiments, objects in the control/monitoring device 30 may include a meta-data property bag for maintaining associated meta-data values. Similar to the measurement data 45, the meta-data 47 may be communicated between components of the control and monitoring system 24 using the state deltas 43. In this way, the HMI 26 may access and/or store the associated meta-data 47 from the control/monitoring system 30 without a user having to separately enter and validate the meta-data 47 in the HMI 26. The HMI 26 may use the meta-data 47 for displaying visualizations, logging historical values of the measurement data 45, and various other functions.

In an industrial control and monitoring context, device elements may emulate operation of a range of physical components, such as a momentary contact push button, a push button with delayed output, a switch, an analog meter display, and so forth. Many pre-programmed device elements may be available for use by the HMI 26. Such functional modules may be accessible via a network, or may be resident on the HMI 26, or resident on a separate device directly linked to the HMI 26. In this way, an HMI supplier or software supplier may provide many possible building blocks from which screens and complex control and monitoring functions may be programmed. Indeed, a library 44 of available device elements may reside on the HMI 26 to facilitate configuration of the HMI 26. The device elements or objects available from the library 44 may include different types representative of types of objects operated by the control/monitoring device 30. In some embodiments, such types stored in the library 44 may include meta-data 47 that is generally consistent across the instances of that particular type of object. That is, the meta-data 47 may be definition driven such that certain values and/or types of the meta-data 47 are associated with objects instantiated from a particular object type stored in the control and monitoring system 24. The screen instructions may call upon the device elements or objects 18 for performing desired functions based upon operator inputs, and these instructions may be programmed into versions of the pre-programmed elements. For example, the operator may provide initiating inputs by touching a location on a touch screen or depressing keys on a keyboard. Based upon the screen instructions and the device elements or objects 18 associated with the instructions (e.g., with specific locations triggering calls or execution of pre-configured device elements) the desired functions may then be executed. Accordingly, the operator is enabled to interact with a process, typically to change screen views, write to registers, or command the generation of other output or control signals. In a stand-alone implementation, the interactions may simply recall or store data, change screens, and so forth.

One or more separate interface screens may be employed, with some HMIs having many such screens and a great number of device elements 18. Each device element 18 may, in turn, be uniquely programmed to consider specific inputs, perform specific functions, and generate signals for specific outputs. A plurality of such device elements 18 can be loaded and hosted in a single software "container" (e.g., ActiveX container) as described below.

The HMI 26 may be configured by interacting directly with a panel or screen on the HMI 26 itself (if one is present), but in many cases configuration will be performed remotely from the programming terminal 46. For example, access is provided directly to the resident library 44 and/or operating system 38 and application 40 via a browser 48 or similar application. In a present implementation, no other specialized software is required at the programming terminal 46. Indeed, the server 42 resident on the HMI 26 may provide access to the device elements in the library 44. By storing the device elements in the library 44 directly on the HMI 26, the risk of version conflicts and so forth may be reduced. Additionally, the HMI 26 may be directly connected to the programming terminal 46, or accessed by reference to an IP address (Internet Protocol address) assigned to the HMI 26.

Once the device elements 18 then resident on the HMI 26 are accessible to the programming terminal 46, aspects of the HMI 26 can be modified or updated directly on the HMI 26 via the communication link from the programming terminal 46. For example, a user may wish to update a particular HMI graphic to provide data, such as historical data or trending relating to information being received from a newly installed sensor 34. Additionally, the user may find it desirable or convenient to update the HMI graphic for presentation of such data while in an off-line mode (e.g., without immediately implementing the changes). In such a scenario, the user may link to the library 44 of available device elements via the programming terminal 46 and use them to modify the HMI graphic or functionality in a development environment.

It should be noted that additional device elements can be added to the library 44. For example, if a trending device element is not resident on the HMI 26, a user can download such an element to the HMI 26 from a configuration library 50 resident on the programming terminal 46. Alternatively, a user could access the trending device element from a resource library 52 accessible via a network (e.g., the Internet), either directly to the HMI 26 or through the programming terminal 46. This may be particularly beneficial because new and improved device elements can be downloaded to the HMI 26 individually and on a periodic basis, thus adding new functionality without necessitating the periodic release of new conversion programs or HMI operating systems, or run-time or design-time environment software. The development environment may provide links to such libraries. Further, in embodiments using embedded code (e.g., operating system, server software, device objects, etc.), because the embedded code resides on the HMI 26, version conflicts with the embedded code may be avoided and the necessity for programming terminal software upgrades may be reduced.

As mentioned previously, meta-data 47 may be stored and associated with the measurement data 45 used to control the process 28. There may be several different types of meta-data 47 that are appropriate for association with certain pieces of measurement data 45. These types of meta-data 47 may be maintained according to meta-data definitions that are stored in a definition store of the control and monitoring system 24. Such meta-data definitions, for example, may include information prescribing particular behavior of the meta-data 47 (e.g., pass-through or copy by default value), the type of the metadata 47 (e.g., string, numeric, etc.), the measurement data types with which the meta-data 47 may be associated, and so forth. In this way, the meta-data 47 may be definition driven such that certain values and/or types of meta-data 47 are associated with objects instantiated based on a particular object type stored in the control and monitoring system 24. A designer or system component may update the meta-data definitions in order to introduce new types of meta-data 47 into the control and monitoring system 24. Components (e.g., HMI 26) of the control and monitoring system 24 may then leverage the new meta-data types according to the stored meta-data definitions. For example, the data store that stores and associates the meta-data 47 with measurement data 45 may access the definition store to enable the new types of meta-data 47 for association with the measurement data 45.

Based on the meta-data definitions, the meta-data 47 may include (but is not limited to) one or more of a name, a description, units, a default value, a maximum value, or a minimum value of the measurement data 45. In certain embodiments, the meta-data 47 may include an indicator of a false state in Boolean data or an indicator of a true state in Boolean data. These may include specialized indicators of a false vs. true state in Boolean data (e.g., "Stopped" vs. "Running", "Open" vs. "Closed", "On" vs. "Off", etc.). By extension, the meta-data 47 may manage textual enumeration for integer data. That is, a certain integer stored in the meta-data 47 may correspond with a certain textual or other type of data (e.g., 1=Red, 2=Green, 3=Blue, 4=Yellow) In addition, the meta-data 47 may include indicators of usage of the measurement data 45, information relating to historization of the measurement data 45, security classifications, conversion factors, locations of measurement data 45, enumeration of state identification, and so forth. In certain embodiments, the meta-data 47 may include string based meta-data capable of association with the measurement data 45 based on one or more locales (i.e., in one or more designated localized languages). In this way, the language of the meta-data string may be localized based on the language needs of the different developers and operators of the control and monitoring system 24.

Different pieces of the meta-data 47 relating to the same measurement data 45 may be stored in multiple locations throughout the control and monitoring system 24, depending on a type or definition of the meta-data 47. For example, certain pieces of the meta-data 47 (e.g., units, maximum value, minimum value) may be stored at a single addressable location (e.g., tag database) within the system. At the same time, other types of meta-data 47 (e.g., Boolean indicators) relating to the same measurement data 45 may be stored at different and/or multiple addressable locations throughout the system (e.g., in control components where the meta-data 47 is likely to be used). In this way, the control and monitoring system 24 is able to maintain multiple and different stores of the meta-data 47 related to the measurement data 45. Similarly, the same pieces of meta-data 47 may be associated with multiple pieces of the measurement data 45 as they are referenced throughout the control and monitoring system 24. For example, the meta-data 47 may be stored and linked with a type definition object such that any object (e.g., tag) that has the same object type may reference the stored meta-data 47. As a result, the meta-data 47 is dynamically associated with the measurement data 45 referenced by the object.

The meta-data 47 may be generated by an end-user (e.g., via the programming terminal 46) or inherited from other objects in the control/monitoring device 30. Components of the control and monitoring system 24 may be configured to reference and utilize the stored meta-data 47 for various tasks. The HMI 26 may reference the measurement data 45 stored in the control/monitoring device 30 and the meta-data 47 associated with the referenced measurement data 45. For instance, the operating system 38 may execute instructions to generate an object in the HMI 26 having properties defined by the referenced measurement data 45 and the meta-data 47. As discussed in detail below, the referenced measurement data 45 and meta-data 47 may be used, for example, to generate an HMI visualization (e.g., virtual on/off button, gauge) representative of the measurement data 45. By loosely associating the meta-data 47 with objects that reference the measurement data 45 in the control/monitoring system 30, a user may define both the control behavior and the HMI characteristics of those objects in the same location (e.g., via programming terminal 46).

In addition to functionality within the HMI 26, certain pieces of meta-data 47 may be used by real-time components of the control and monitoring system 24. The control/monitoring device 30 may actuate certain devices of the process 26 based in part on the meta-data 47 associated with the detected measurement data 45. For example, the control/monitoring device 30 may be configured to operate one or more of the actuators 36 when the measurement data 45 received from one or more of the sensors 34 reaches a threshold value defined in the associated meta-data 47. For this reason, it may be desirable to store at least portions of the meta-data 47 in a memory of the control/monitoring device 30. Some portions of the meta-data 47, however, may not be used by the real-time components (e.g., control/monitoring device 30, process 26, etc.) of the control and monitoring system 24. Software within the control and monitoring system 24 may therefore execute instructions for storing the meta-data 47 where it will be used. That is, the control and monitoring system 24 may detect whether the meta-data 47 will be accessed by the real-time components, and store the meta-data 47 that will be accessed by the real-time components in a first storage medium. This first storage medium may include RAM of the control/monitoring device 30, or a corresponding control/monitoring device in systems with multiple such devices, or some other relatively high speed storage medium. Such detection may be made on the basis of whether objects in the control/monitoring device 30 reference the meta-data 47 in order to execute specific control commands. The control and monitoring system 24 may store the meta-data 47 that is not used by the real-time system components elsewhere (e.g., in a slow speed storage medium such as the database 49 of the HMI 26). In this way, different pieces of the meta-data 47 that are loosely associated with the same measurement data 45 may be stored in components of the control and monitoring system 24 where they will be used. This may provide a more efficient use of memory throughout the control and monitoring system 24 than would be possible if all of the meta-data 47 were stored in the control/monitoring device 30. In some embodiments where the meta-data 47 is used by certain real-time system components, the control and monitoring system 24 may store the meta-data 47 where it is readily accessible to the real-time system components.

Present embodiments of the control and monitoring system 24 may be configured to distribute the meta-data 47 to components of the control and monitoring system 24 that may use the meta-data 47. For example, a user may input the meta-data 47 for use by the control/monitoring device 30 and/or the HMI 26 via the programming terminal 46. From here, the meta-data 47 may be distributed to and stored in appropriate components (e.g., control/monitoring device 30, database 49, etc.) of the control and monitoring system 24. Components of the system may reference the meta-data 47 from the appropriate data store, along with the corresponding measurement data 45, for performing a desired function (e.g., generating an HMI visualization, controlling the process 28, etc.). In addition to distributing the meta-data 47 to the components that may use the meta-data 47, the control and monitoring system 24 may detect changes in the meta-data 47 and provide the change in the meta-data 47 to the components that use the meta-data 47. Such changes in the meta-data 47 may be dynamically communicated via the state deltas 43, similar to the measurement data 45. These methods of storing and distributing the meta-data 47 throughout the control and monitoring system 24 may allow better integration across the control/monitoring device 30, HMI 26 and other system components.

To track the state information of the one or more components of the control and monitoring system 24, the components of the control and monitoring system 24 may use a distributed data model representing various aspects of the control and monitoring system 24. For example, the distributed data model may enable multiple cached copies of a data model representing the control and monitoring system 24 to exist within the control and monitoring system 24 (e.g., at one or more of the components of the control and monitoring system 24). The distributed data model may work in conjunction with delta scripting and distributed command handling. The delta scripting may enable one or more components of the control and monitoring system 24 to determine state changes to the data model, generate a delta script that contains only the changes to the data model and/or the entire data model, and provide the delta script to other components of the control and monitoring system 24. The other components may consume the delta scripts and apply the measurement data 45 and/or meta-data 47 contained within the delta scripts to a locally cached copy of the data model (e.g., distributed copy contained at one of the components of the control and monitoring system 24).

Figure 3:
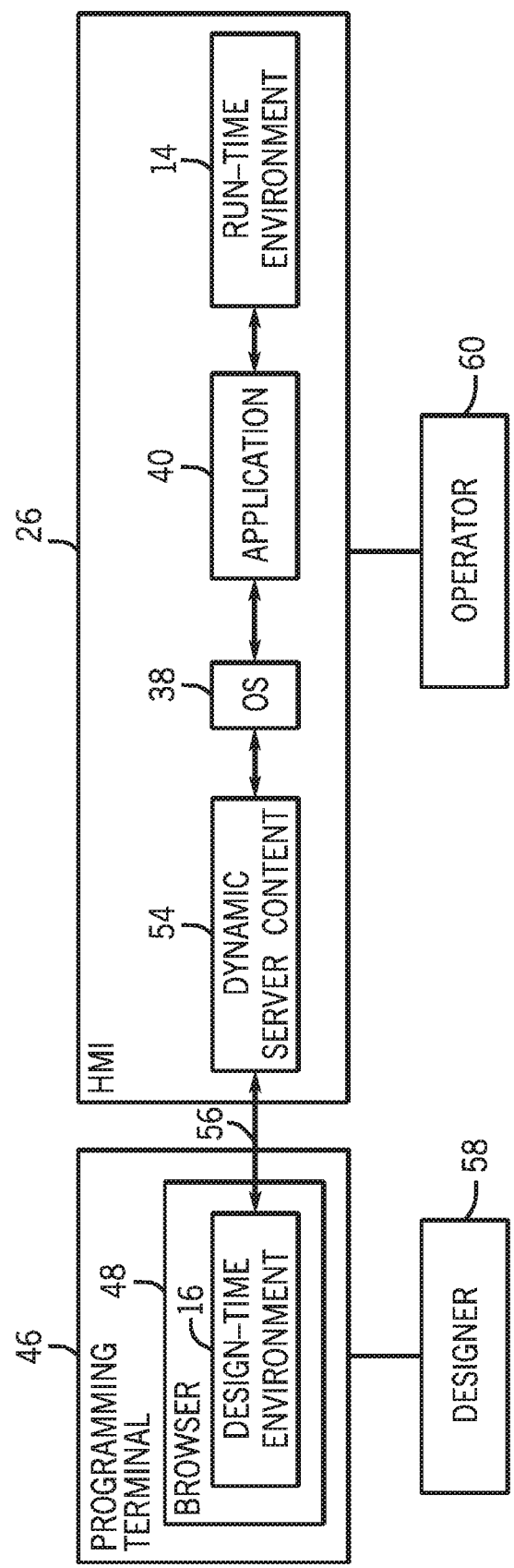
FIG. 3 is an overview of certain of the functional components in an interface and a programming terminal in accordance with an embodiment of the present techniques.

To better illustrate the relationship between the design-time and run-time environments, FIG. 3 provides a high-level flow diagram representing interaction between the HMI 26 and the programming terminal 46. In general, a platform for the HMI 26 and programming terminal 46 will include the operating system or executive software 38, application software 40, as well as any communication software, a microprocessor, a network interface, input/output hardware, generic software libraries, database management, user interface software, and the like (not specifically represented in FIG. 3). In the illustrated embodiment, a design-time platform and a run-time platform interact within the HMI 26. The design-time platform provides views that are served as the design-time environment 16 to a desktop personal computer platform (e.g., running a suitable operating system 38, such as Microsoft Windows OS, MAC OS, or Linux) and the run-time platform cooperates with the design-time platform via the operating system (e.g., a Microsoft Windows OS, MAC OS, iOS, Android, or Linux). The design-time platform provides dynamic server content 54, while the run-time platform displays views on the HMI 26 itself (if a display screen is provided on the HMI 26). The design-time environment 16 may be displayed in the browser 48 (e.g., Web browser or other general purpose viewer), or the design-time environment 16 may be implemented as an application that is not contained in the browser 48.

FIG. 3 represents at a very high level how the design-time environment 16 interacts with the operating system 38, application 40 and run-time environment 14. The arrow 56 represents dynamic exchange of content between the HMI 26 and programming terminal 46. In general, interaction with the design-time environment 16 is the task of a designer 58 who initially configures the HMI screens or visualizations, meta-data, device elements, their functions and interactions, or who reconfigures such software. The designer 58 may utilize the programming terminal 46 in the design environment 16 to configure certain pieces of the meta-data 47 stored in the control/monitoring device 30 of FIG. 2. The run-time environment 14 is generally interacted with by an operator 60 directly at the HMI 26. It should be noted that while the design-time environment 16 has specific needs, in certain embodiments, it may depend on the operating system 38, application 40 and run-time environment 14. The design-time environment 16 and the run-time environment 14 may utilize certain base technologies (e.g., DHTML, HTML, HTTP, dynamic server content, JavaScript, Web browser) to operate respectively in the design-time platform and run-time platform. While, in the illustrated embodiment, the run-time environment 14 and the design-time environment 16 reside on separate platforms, in some embodiments they may reside on the same platform. For example, the design-time platform and run-time platform may be configured as or considered a single platform.

In one embodiment of the present invention, a design-time Web implementation is utilized. This design-time Web implementation offers the speed and flexibility of software running on the design-time platform by using a Web browser (e.g., 48) with DHTML support from the HMI, as noted by the dynamic server content 54 in FIG. 3 and as described below. DHTML is used to perform dynamic manipulation of Web content in the design-time environment 16. Further, the dynamic server content 54 is used in the HMI to serve dynamic Web content to the design-time environment 16. This dynamic client-server environment allows the Web browser to simulate an application running on the design-time platform without requiring a piece of software compiled for a related processor. In other embodiments, the design-time environment 16 may be directly accessed over the server via a networked client device, instead of through a Web-based implementation.

Figure 4:
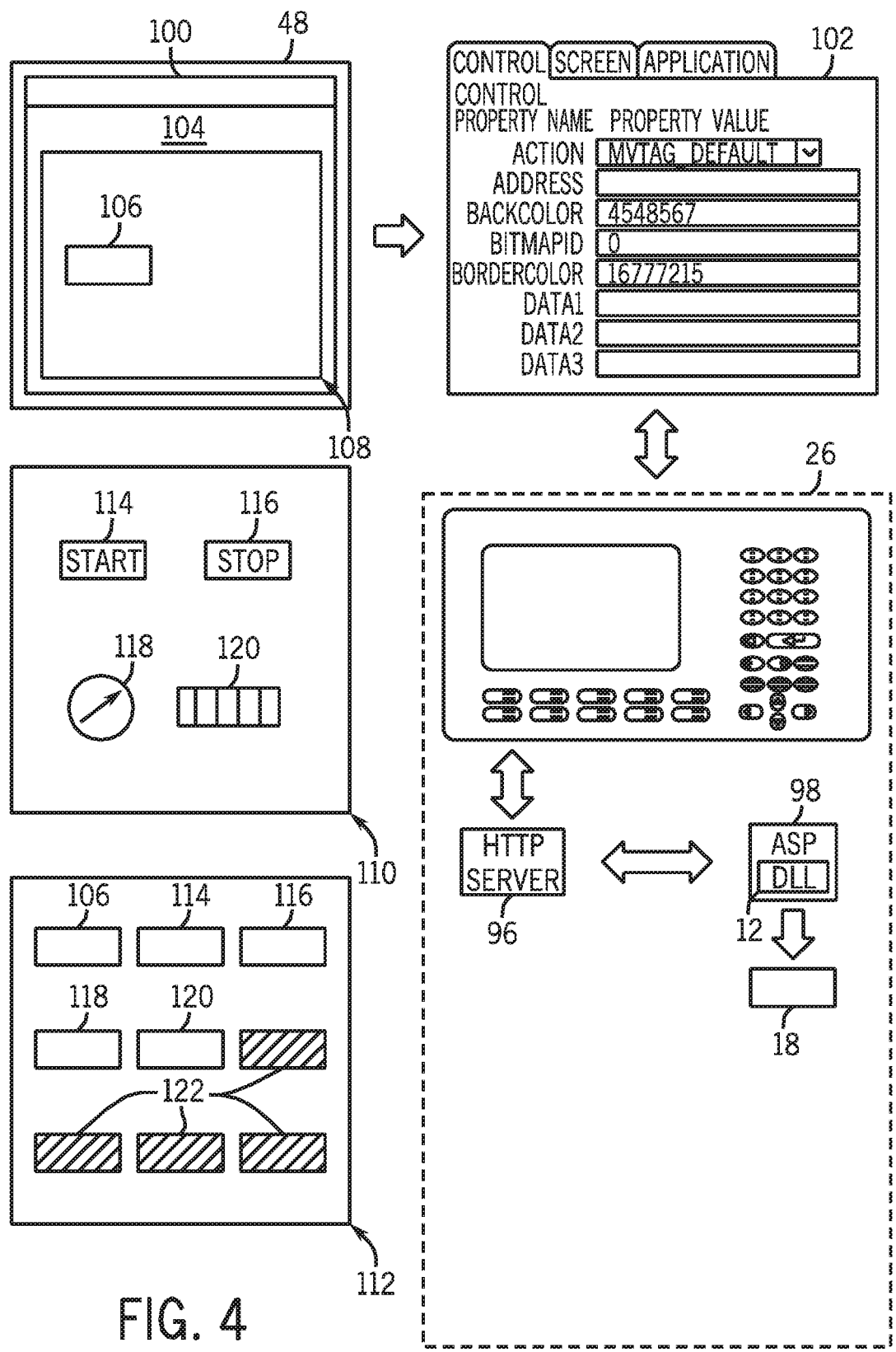
FIG. 4 is an overview of certain views or containers of device elements in accordance with an embodiment of the present techniques.

FIG. 4 is a diagram illustrating one or more device elements 18 in a design-time environment in accordance with embodiments of the present techniques. The diagram includes interactions illustrated by relationships between a display 100 (e.g., a screen for browser display), a property editor 102, and the HMI 26.

The design-time environment represented by the configuration screen or display 100 includes static content 104 and dynamic content. The dynamic content includes images corresponding to any displayed or represented device elements 106 (e.g., virtual on/off button, gauge). In one embodiment of the present techniques, the image is specified by an image tag in HTML and is part of a JPEG file created by the HMI 26. The static content 104 may be created by the ASP server or it may preexist in an HTML file. It should be noted that, in some embodiments, designated designers only can edit the static content 104. As previously noted, the device element representations 106 may be based at least in part upon referenced measurement data 45 (e.g., from registers 32) and referenced meta-data 47 associated with the measurement data 45. For example, minimum and maximum values associated with a live measurement value may be used to determine an upper and lower limit of a gauge representation and a position of the gauge needle between these limits.

In the representation of FIG. 4, the device element representation 106 is contained within a view container 108. As will be appreciated by those skilled in the art, a container generally defines a portion of a processing space in which certain device elements are opened and ready for use. The container 108 may thus correspond to a first view container that includes only the elements viewable within the current screen. As discussed above, many such screens may be provided in the HMI 26. Other screens, such as alternative control or interface screens may be provided in other view containers, such as a container 110. In general, to speed the operation (e.g., changing between screen views) of the HMI 26, such view containers are predefined and associated with one another by definition of the individual device elements with which they are either associated or within which representations of the device elements are provided. A global container 112 may be defined to include all of the device elements necessary for the various view containers, as well as other elements that may not be represented in any view container. As illustrated in FIG. 4, therefore, view container 108 includes the virtual button 106 which performs a "jog" function and is manifested by a representation in a first screen. The new container 110 includes several components, such as a "start" button 114, a "stop" button 116, a virtual gauge 118 and a digital readout 120. The global container 112, then, will include all of these device elements for the various view containers, as well as any device elements 122 that are required for operation of the viewable device elements but that are not themselves viewable. Such device elements may include elements that perform computations, trending, communications, and a wide range of other functions.

FIG. 4 also illustrates a property editor 102 in which a user may access various properties of the element 106. As discussed above, the element 106 may also include connections and text associated with the element 106, which may also be configured by the user via an editor, similar to the property editor 102.

In an embodiment, the property editor 102 may interact with the HMI 26 via a query string from the browser (e.g., browser 48 of FIG. 2) to a server 96 (e.g., HTTP server) that is resident on the HMI 26. The server 96 cooperates with an ASP server 98 including the module based interconnection mechanism 12, such as a dynamic-link library (DLL) to receive and respond to queries. The DLL allows for storage of executable routines as separate files, which can be loaded when needed or referenced by a program. In the example set forth above, upon receiving the call, the page is reloaded by the ASP server 98 and the query string is initially parsed, resulting in evaluation of the move command. Server side scripts then access the device element 18 represented by the image 106 and to update its location property. The new property information is then updated on the page and the page is passed to the browser 48.

Figure 5:
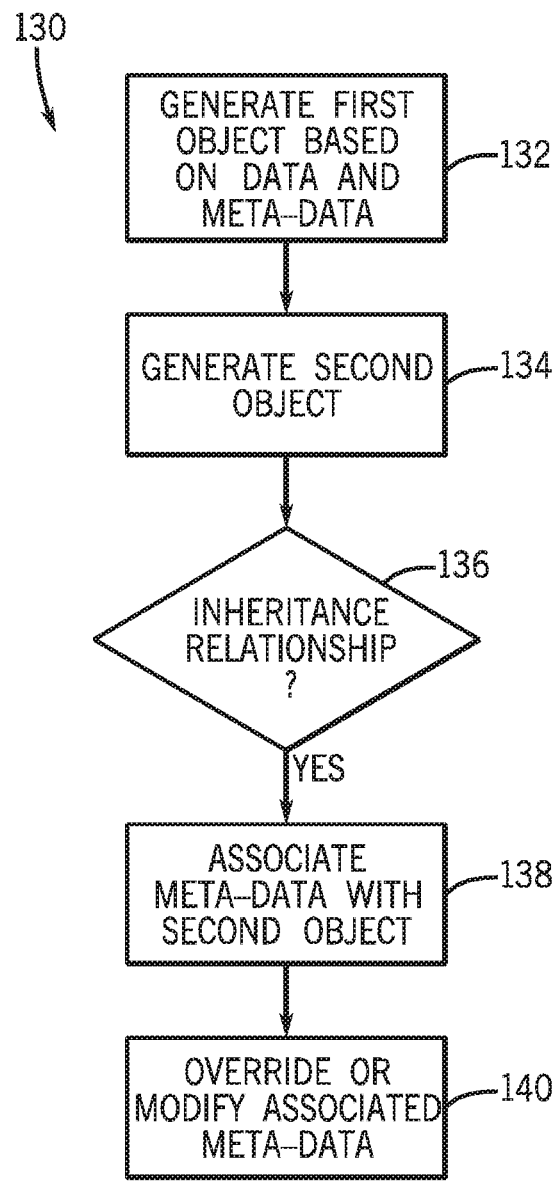
FIG. 5 is a flow diagram of a method for passing associated meta-data from one object to another in accordance with an embodiment of the present techniques.

The control and monitoring system 24, as previously stated, includes one or more data stores for associating meta-data 47 with live measurement data 45 by dynamically extending the data structure of the measurement data 45. This use of meta-data 47 may have several advantages over other automation control and monitoring systems. One such advantage includes the ability to associate meta-data 47 with objects 18 in the control/monitoring device 30 without a user explicitly configuring the meta-data 47 values (e.g., input through the programming terminal 46). FIG. 5 illustrates this ability, which may be referred to as "pass-through" behavior, in an exemplary method 130. It should be noted that the method 130 may be implemented as a computer or software program (e.g., code or instructions) that may be executed by a processor (e.g., in control/monitoring device 30, programming terminal 46, operating system 38, etc.) to execute one or more of the steps of the method 130. Additionally, the program (e.g., code or instructions) may be stored in any suitable article of manufacture that includes at least one tangible non-transitory, computer-readable medium that at least collectively stores these instructions or routines, such as a memory or storage component of the control and monitoring system 24. The term non-transitory merely indicates that the medium is not a signal.

The method 130 includes generating (block 132) a first object based at least in part on referenced measurement data and associated meta-data. The measurement data 45 and meta-data 47 may be referenced by a computer system (e.g., HMI 26 or programming terminal 46) to generate the object in the HMI 26. The meta-data 47 referenced by the computer system may include meta-data 47 associated with a type definition object already stored in control/monitoring device 30 or the HMI 26. The programming terminal 46 may be used to generate a tag in the HMI 26 that references the measurement data 45 from the control/monitoring device 30 and meta-data 47 (e.g., from a stored type definition), and store the referenced data in a tag database (e.g., database 49) of the HMI 26. The tag database may employ a data structure that is larger than the data structure used to define only the measurement data 45 stored in the control/monitoring device 30 because of the additional meta-data 47 associated with the measurement data 45. In order to support sparse population of meta-data, the referenced meta-data 47 may be stored separately and attached to the measurement data 45.

The method 130 also includes generating (134) a second object based on referenced measurement data. The second object may be generated by the same computer system that generates (block 132) the first object. For example, the second object may be a tag referencing a piece of the measurement data 45 from the control/monitoring system 30 and added to a tag database of the HMI 26. The second tag, upon generation, may not include the meta-data 47 associated with the referenced measurement data 45, or the tag may include only a portion of the associated meta-data allowed by the extended data structure of the tag database in the HMI 26. For example, the first object (which may be a tag object or a type definition object) generated and stored in the control and monitoring system 24 may include a minimum value, a maximum value, and engineering units as associated meta-data. However, the second object (tag generated and stored in the tag database) may include a minimum value and a maximum value, but no engineering units. In this case, the HMI 26 may detect the absence of an "engineering units" meta-data value associated with the second object. As a result, the "engineering units" property may be listed as "not defined" in the tag database.

The control and monitoring system 24 may be configured to take explicit action when a meta-data property is "not defined." For example, the illustrated method 130 includes determining (block 136) if a pass-through relationship exists between the first and second objects. A pass-through relationship may include type similarities of the generated objects. For example, as previously mentioned with regard to FIG. 2, the programming terminal 46 may be used to generate objects in the HMI 26 by configuring device elements downloaded from one or more libraries 44, 50, 52 of the control and monitoring system 24. In some embodiments, two objects may be configured using the same downloaded object type. Object types stored in the libraries 44, 50, 52 may include a type/structure definition specifying an extended data structure for maintaining values of the measurement data 45 and meta-data 47. Any objects generated using the same type to reference measurement data may have similar associated meta-data. Thus, a pass-through relationship exists. A pass-through relationship also may exist when a user generates the second object by copying and pasting the first object in the HMI 26. When a pass-through relationship exists, the method 130 further includes associating (block 138) the meta-data 47 referenced by the first object with the second object. The control and monitoring system 24 effectively passes the referenced meta-data 47 from one object to another when the objects are related. In the context of managing object tags, a user may not have to configure meta-data 47 values associated with each tag in a tag database. However, as shown in the method 130, the computer system used to generate these objects and pass the meta-data between the related objects may also be configured to override (block 140), modify, or extend (e.g., concatenate), at least a portion of the meta-data 47 associated with the second object. In some embodiments, the HMI 26 or programming terminal 46 may request validation from a user before configuring the meta-data of the second object based on a pass-through relationship.

Figure 6:
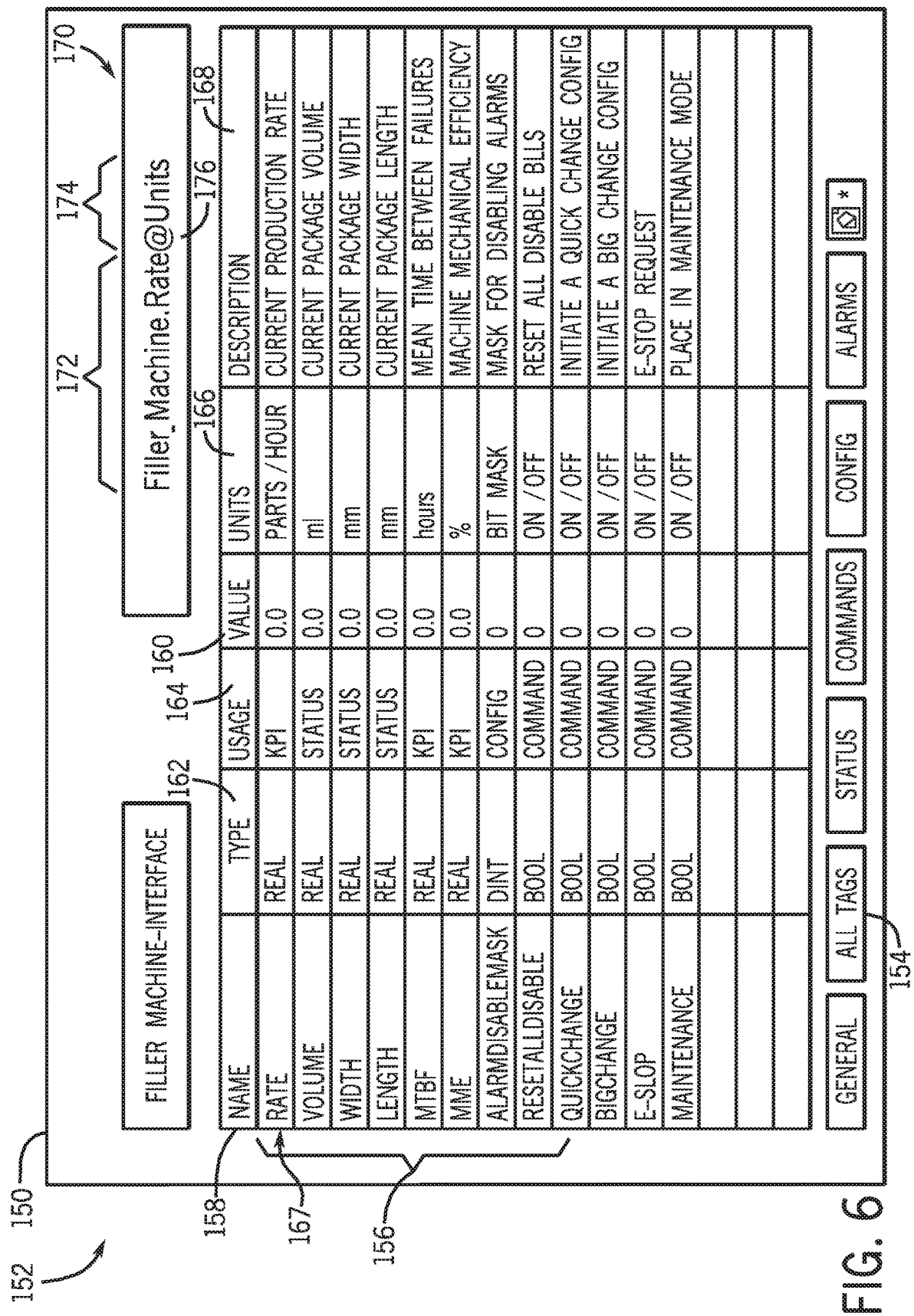
FIG. 6 is a view of a screen representing a tag database in an interface in accordance with an embodiment of the present techniques.

FIG. 6 is a view of a screen 150 representing a tag database 152 stored in a component (e.g., HMI 26) of the control and monitoring system 24. While the illustrated embodiment specifically represents a tag database, similar functionality may be used to dynamically link the meta-data 47 with other data in the control and monitoring system 24, such as type definition objects or measurement data 45 stored in control components of the control and monitoring system 24. The screen 150 may be displayed via the HMI 26 or programming terminal 46 upon selection of an "All Tags" tab 154. The illustrated tag database 152 includes twelve different tags 156, each of which reference data related to the operation of a filler machine used in the process 28. It should be noted that the screen 150 is exemplary and certain embodiments may display tags relating to different process equipment (e.g., tank, valve, motor, etc.) acted on by the control/monitoring device 30. The measurement data 45 referenced by the tags 156 may include a tag "Name" 158 used to identify the specific tag and a tag "Value" 160, or live data value detected via the sensors 34 of the control/monitoring device 30. That is, the data structure of the measurement data 45 may include the name 158 and corresponding value 160. The tag database 152 acts as a data store for storing the measurement data 45 and meta-data 47 associated with the measurement data 45, thereby extending the measurement data structure. In the illustrated embodiment, the meta-data 47 includes a tag "Type" 162, "Usage" 164, "Units" 166, and "Description" 168. In other embodiments, the referenced meta-data 47 could include other additional information such as a minimum value, a maximum value, an indicator for whether the value should be historized, display properties, etc. The type 162 of a particular tag indicates the datatype (e.g., real, integer, Boolean, etc.) of the related value 160 of the measurement data 45. The usage 164 may refer to what the value 160 is used for in the control and monitoring system 24. For instance, the usage 164 may identify certain measurement data values 160 as key performance indicators (KPIs) for determining how well the control/monitoring device 30 is operating the process components. The units 166 may indicate the engineering units of the measurement data with which it is associated, and the description 168 may provide a full description of what is meant by the name 158 of the referenced measurement data. In other embodiments, the meta-data 47 may include a "security classification" that can be used to facilitate security. The security classification meta-data, when linked with the measurement data 45, may describe what roles can read and/or modify objects that reference the particular measurement data 45. For example, data having the security classification of "Status" or "Command" may be accessed by run-time operators, while data having the security classification of "Config." may be accessed by engineers (designers) interacting with the design-time environment 16.

The tag database 152 incorporates the additional meta-data 47 in order to extend the data structure of the measurement data 45 without having the meta-data 47 as part of the measurement data structure. It should be noted that while there is space available within the control and monitoring system 24 for the meta-data 47 to be associated with the measurement data 45, the space available for the meta-data 47 is only consumed for those pieces of measurement data 45 that do have the meta-data 47 associated therewith. Since the space is only used as needed, the control and monitoring system 24 is able to transfer data and associated meta-data 47 throughout the system more efficiently than would be possible if the meta-data 47 took up space within a rigid measurement data structure. In this way, the meta-data 47 in FIG. 6 is associated with each of the tags 156 independently of any static schema definition of the measurement data 45 supported by the control/monitoring device 30. For example, the illustrated "Rate" tag 169 may reference the measurement data corresponding to the name 158 and the corresponding value 160 detected by one or more sensors 34 of the control/monitoring device 30. This measurement data 45 may be all that is needed from this tag for operating the control/monitoring device 30. Other components of the control/monitoring device 30 may use the name 158 to reference and read the corresponding value 160 in order to control the process 28, without needing to know the description 68, for example. However, the tag database 152 may include the full extended set of meta-data related to the "Rate" tag 169, in order to provide a full interpretation of the value 160 to a user. For example, a user viewing the screen 150 may see that the "Rate" 169 is measured and communicated as a real value (type 162), functions as a key performance indicator (usage 164), is measured in parts per hour (units 166), and is more specifically a measurement of the current production rate (description 168) of the filler machine.

Certain naming conventions may be applied in order to distinguish a user specified namespace around the measurement data 45 from a product defined namespace that contains its associated meta-data 47. To that end, the meta-data 47 and the measurement data 45 may occupy distinct namespaces when referenced by components of the control and monitoring system 24. As an example, a name 170 that may be used for programming and referencing a meta-data value (units 166) of the "Rate" tag 169 is shown in the top right hand corner of the screen 150. The measurement data 45 (i.e., rate of the filler machine) referenced by the tag is represented in a measurement data namespace 172 of the name 170. A meta-data namespace 174 of the name 170 identifies the referenced meta-data 47 (i.e., units 166) applied to the measurement data 45 identified in the measurement data namespace 172. These namespaces 172 and 174 may be used to distinguish between items having a defined data structure (e.g., user-defined) from the meta-data (or meta-properties) that the control and monitoring system 24 may associate with those items, thereby extending the data structure. In the illustrated embodiment, the namespaces 172 and 174 are differentiated from each other by a special identifier 176 (e.g., "@") included in the meta-data namespace 174. The special identifier 176 may be pre-pended to the meta-data namespace 174 to indicate the break between the name identifying the measurement data 45 and the name identifying the meta-data 47 associated with the measurement data 45. If an object in the HMI 26 or control/monitoring device 30 references only the measurement data 45 related to the rate of the filler machine, this may be denoted using just the measurement data namespace 172. The name "Filler_Machine.Rate" represents the live data value 160 of the rate as determined by process components. The name "Filler_Machine.Rate@Units", however, represents the units of the rate (e.g., parts/hr as shown in the tag database 152). By separating the namespaces 172 and 174, it may be possible for components of the control and monitoring system 24 to easily distinguish between and separate measurement data 45 and meta-data 47. This naming convention also allows the meta-data 47 to be associated with the measurement data 45 without being stored in the same manner as the measurement data 45. That is, the meta-data 47 is associated with the measurement data 45 (via the measurement data namespace 172) without being stored as part of the real-time data structure of the measurement data 45. This may allow the meta-data 47 to be separated from the real-time data when the meta-data 47 is not being used by the real-time components. As a result, additional named items of meta-data 47 may be added to the meta-data namespace 174 without concern of name collision with the measurement data 45 in the measurement data namespace 172.

Figure 7:
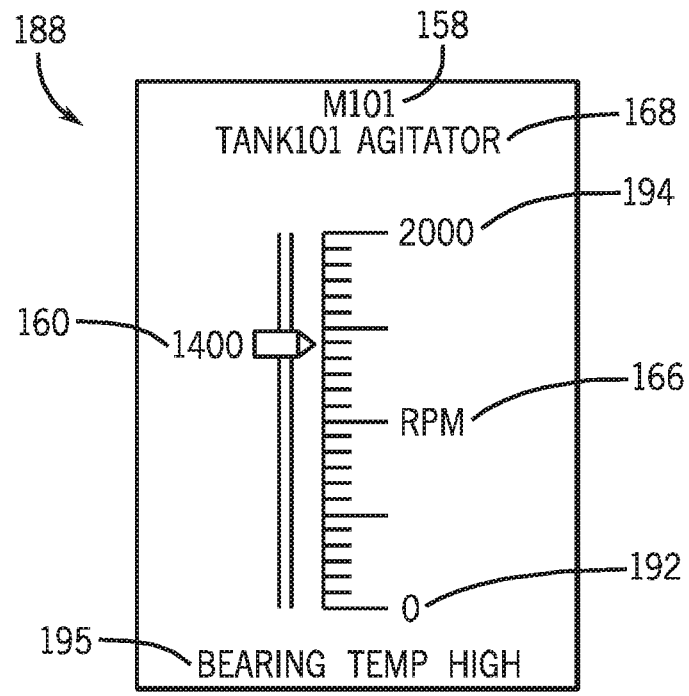
FIG. 7 is a representation of a visualization graphic for displaying measurement data and associated meta-data in accordance with an embodiment of the present techniques.

Certain pieces of stored meta-data 47 may be used to generate informative graphics on computer or HMI displays. As an example, FIG. 7 illustrates a graphic 188 for displaying measurement data 45 and associated meta-data 47 relating to a tank agitator. The associated meta-data 47 may allow a user to create such graphic elements (e.g., graphic 188) simply by calling the corresponding instance tag. That is, a user may bring up the illustrated graphic 188 by calling an "M101" instance tag. The meta-data 47 associated with the instance tag may provide context for the live measurement value 160 (i.e., 1400). This value may be identified in the control and monitoring system 24 by the name InstanceTag.MotorSpeed. This name is entirely within the measurement data namespace 172, indicating that the value 160 is included in the measurement data 45 accessed by the M101 instance tag. In addition to the value 160, the graphic 188 includes the name 158 (i.e., M101), the units 166 (i.e., RPM), the description 168 (i.e., Tank101 Agitator), a minimum value 192 (i.e., 0), and a maximum operating value 194 (i.e., 2000). These pieces of meta-data 47 may be identified in the control and monitoring system 24 by the following names: M101.@Name, M101.MotorSpeed@EU, M101.@Desc, M101.MotorSpeed.@Min, and M101.MotorSpeed@Max. As before, the "@" may be used to separate the meta-data namespace 174 from the measurement data namespace 172. Since each of these pieces of meta-data 47 is associated with the tank agitator M101, or the motor speed thereof, the meta-data 47 is referenced along with the measurement data 45 when the M101 instance tag is called.

It may be desirable for an object to access, or operate on, more than a single data structure. Such an object might reference a main data structure instance each time the object is instanced, while also referencing one or more other data structure instances to access related data. These other data structure instances may be referred to as "associated tags" of the main data structure, and the names (i.e., object identifiers) of these associated tags can be stored in the metadata 47 associated with the measurement data 45 in the main data structure. The metadata 47 may include names given to represent each of the associated tags.

Components of the control and monitoring system 24 may automatically generate such associated tags for the objects based on configuration information available within the system (e.g., pass-through meta-data, object type libraries, etc.). This may free the designer 58 from having to manually create each associated tag relationship during initial configuration. In order to configure the HMI 26 to monitor the object via the associated tags, the designer 58 may simply link an HMI visualization object to the main data structure instance. The HMI visualization object can then access any relevant data by referencing only the main data structure in order to provide the data in an HMI visualization (e.g., graphic 188). This allows the HMI visualization to access the associated tag data without knowing a particular instance name of the associated tags.

The following is an example of the use of associated tags stored as meta-data 47. The instance tag "M101" may call a control algorithm in the control/monitoring device 30 having a data structure specifying certain motor functions, such as .Start, .Stop, .SpeedSetpoint, .SpeedActual, and .BearingTemperature. The values of these motor functions, which may be monitored by the control/monitoring device 30, form the measurement data 45 stored in the main data structure of M101. There may be alarm data related to the measurement data 45 of the motor, which is stored in the meta-data 47 associated with the measurement data 45. This alarm data may include a separate data structure specifying members, such as .InAlarm, .Acknowledged, and .AlarmCount. An instance of the alarm data structure for the motor M101 may be named "M101_AlarmData". The control and monitoring system 24, or a user configuring the system via the programming terminal 46, may generate an attribute for storage in the meta-data 47 of the M101 tag. The attribute, named "AlarmDataStructureName", may then be linked with the M101_AlarmData data structure. This effectively associates the M101_AlarmData tag with the M101 tag via the meta-data 47 associated with the motor's measurement data 45.

After configuring this meta-data 47, it is possible to create a visualization object (e.g., to display the graphic 188) in the HMI 26, which displays all the data for the motor, including the associated data relating to the alarm. This may be accomplished simply by linking the visualization object to the M101 tag, without having to know the name of the alarm data tag. By referencing the name M101, the visualization object may access motor data including, for example, M101.Start to start the motor, M101.BearingTemperature to read the temperature of the motor bearing, and M101.@AlarmDataStructureName.InAlarm to determine if the motor is in alarm. Again, the control and monitoring system 24 is able to monitor such data (including the alarm data) without knowing more than the instance name (e.g., M101) of the main data structure. Such associated tag data structures may be extended to multiple levels. That is, the associated data structures may have their own meta-data with references to additional associated data structures, all of which may be accessed by calling the main data structure. "M101.@AlarmDataStructureName.AlarmCount.@ Description", for example, would return a description of the M101 AlarmData.AlarmCount structure member, as it is stored in the meta-data 47 linked with M101 AlarmData.AlarmCount, which is stored in the meta-data 47 linked with M101. In this way, using the metadata 47 to access associated tags allows users to easily instantiate objects such as HMI visualizations by referencing a single main data structure instance name. This may reduce an amount of time spent configuring such HMI visualizations, which traditionally relied on a user referencing each related tag instance name for each instance of a display object.

Figure 8:
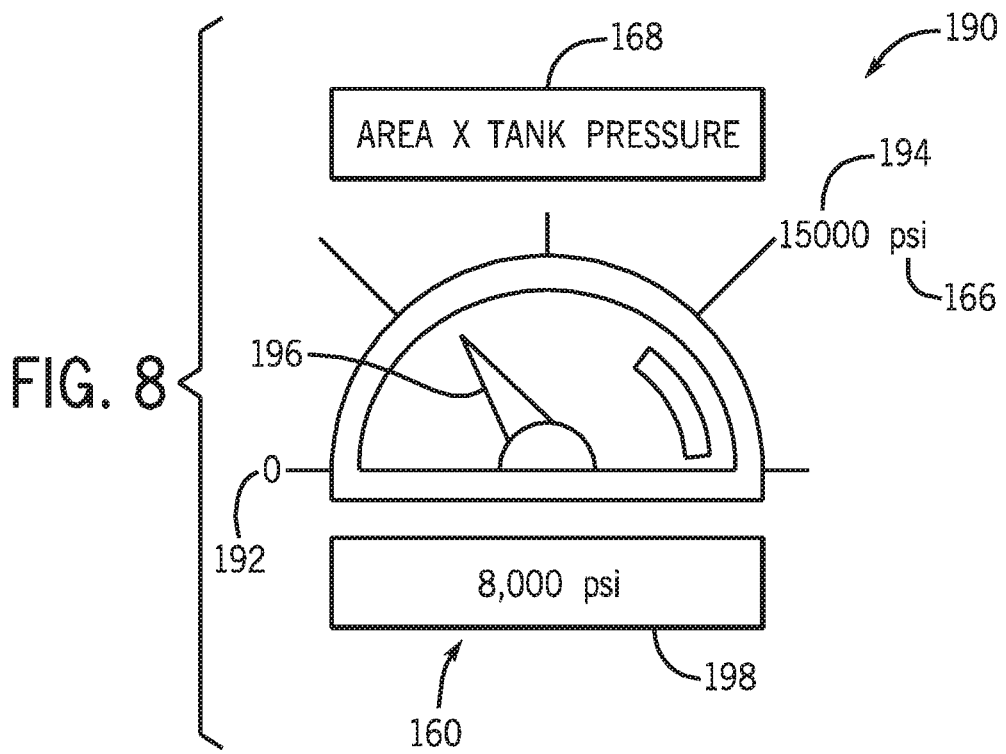
FIG. 8 is a representation of a gauge graphic for displaying measurement data and associated meta-data in accordance with an embodiment of the present techniques.

Another example of an informative graphic generated using the stored meta-data is shown in FIG. 8, which illustrates a gauge graphic 190 for displaying measurement data 45 and associated meta-data 47 relating to a tank pressure. The meta-data 47 may be used to provide context for a measurement value referenced by the gauge graphic. In addition to the value 160 (i.e., 8500) of the detected measurement data 45, the graphic 190 includes the units 166 (i.e., psi), the description 168 (i.e., Area X tank pressure), the minimum value 192 (i.e., 0), and the maximum operating value 194 (i.e., 15000) associated with the value 160. The graphic 190 also may incorporate the meta-data 47 in a way that determines how the measurement data 45 is displayed. For example, the graphic 190 may include a simple gauge that positions a needle 196 at an appropriate location to represent the measurement data value 160 (e.g., between the minimum and maximum values 192 and 194) and certain features of the gauge to indicate the maximum operating value 194, as defined by the referenced meta-data 47. In addition, a background 198 for displaying the value 160 as a digital number may be a certain color when the value 160 is above or below a threshold value. Many different types of graphics may be created in an HMI visualization to display the same measurement data, and a desired graphic for the display may be stored as meta-data associated with the measurement data 45 referenced by a particular object.

FIG. 9 is a process flow diagram of a method 200 for generating and using meta-data in the control and monitoring system 24. The method 200 includes acquiring (block 202) measurement data 45 from automated control system components (e.g., sensors 34 of control/monitoring device 30). The method 200 also includes storing (block 204) the measurement data 45 at an addressable location via an automation controller, and storing (block 206) a tag related to the measurement data 45 in a tag database. The addressable location may be one or more registers 32 of the control/monitoring system 30, from which the HMI 26 reads the measurement data 45 to generate and store a corresponding tag in the database 49 of the HMI 26. The tag includes the addressable location and a tag identifier (e.g., name 158). Further, the method 200 includes storing (block 208) meta-data 47 relating to the tag via a computer, wherein the tag does not include the meta-data 47. An end-user (e.g., designer 58) may generate the meta-data 47 via the programming terminal 46. While the meta-data 47 is related to the measurement data 45 stored in the tag database, it is not stored in a rigid structure of the tag. The data may be accessed at the addressable location via reference to the tag identifier stored in meta-data 47 relating to a different tag. That is, the different tag may include a reference to the tag identifier in its associated meta-data, through which a control component accessing the other tag may access the data. In this way, the meta-data 47 may be utilized for managing reference tags throughout the control and monitoring system 24.

In the illustrated embodiment, the method 200 includes accessing (block 210) the meta-data 47 with a separate computer and performing (block 212) an automation control system activity based on the meta-data 47 via the separate computer. For example, the HMI 26 may access the generated meta-data 47 in order to provide (block 214) an HMI visualization of the tag. That is, the meta-data 47 may include information about how to display a visualization graphic (e.g., gauge graphic 190 of FIG. 7) of the tag on an HMI screen. In some embodiments, the HMI 26 may access the meta-data 47 related to a tag for historizing (block 216), or logging historical measurement data related to the tag. That is, the meta-data 47 may provide a flag signaling the HMI 26 to log the measurement data 45 at certain intervals, in order to generate a historical log of the measurement data 45. The logged data may be stored in the HMI 26, allowing a user to reference historical data for a given component of the control/monitoring device 30. Another automation control activity that may be performed (block 212) by the separate computer (e.g., HMI 26) involves executing (block 218) customized computer-readable instructions provided by an end-user of the control and monitoring system 24. The computer-readable instructions may include one or more references to the meta-data 47, such as for storing the meta-data 47 in the tag database by extending a data structure of the tag to include its related meta-data 47. The automation control system activity may include other activities, such as securing the measurement data 45 based on a security classification included in the associated meta-data 47, or automating the use of the measurement data 45 by external components (e.g., manufacturing execution system application), based in part upon configuration information (e.g., KPIs or overall equipment efficiency measurements) provided in the meta-data.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An automation control and monitoring system, comprising:
    a sensing component;
    a tag object data store configured to:
        store tag object data of a tag object in one or more data fields defined by a data structure of measurement data acquired by the sensing component; and
        extend the data structure based on a pass-through relationship between the tag object and another tag object of the tag object data store;
    a processor, configured to:
        extend the data structure by associating metadata with the tag object data by:
            identifying an object type reference associating tag objects of a particular type to the metadata; and
            associating the tag objects of the particular type to the metadata based upon the object type reference; and
    a distributed component configured to access at least a portion of both the tag object data and the metadata from the tag object data store, by:
        providing a name reference that comprises a measurement data namespace, indicating a particular instance of the tag object and particular measurement data from the one or more data fields associated with at least one of the tag objects of the particular type and a metadata namespace, indicating a particular field of metadata from the metadata associated with the at least one of the tag objects of the particular type, wherein the name reference comprises a special identifier that separates the measurement data namespace from the metadata namespace and a second special identifier that separates the particular instance of the tag object from the particular measurement data; and
        in response to providing the name reference, receiving, from the tag object data store, measurement data and metadata identified by the name reference.

2. The automation control and monitoring system of claim 1, wherein the special identifier comprises an @.

3. The automation control and monitoring system of claim 1, wherein the particular instance of the tag object comprises an indication of a particular component of the automation control and monitoring system.

4. The automation control and monitoring system of claim 1, wherein the particular measurement data from the one or more data fields comprises a name indication, a value indication, or both.

5. The automation control and monitoring system of claim 1, wherein the metadata namespace comprises a type indication, a usage indication, a units indication, a description indication or any combination thereof.

6. The automation control and monitoring system of claim 1, wherein the particular field of metadata comprises a minimum value indication, a maximum value indication, an indication of whether a value should be historized, an indication of display properties, or any combination thereof.

7. The automation control and monitoring system of claim 1, wherein:
    the data structure consists of a name field, type field, description field, and value field without support to support additional data.

8. The automation control and monitoring system of claim 7, wherein the metadata is associated with the tag object data independent of any schema definition of the data.

9. The automation control and monitoring system of claim 1, wherein the distributed component comprises a human machine interface (HMI).

10. A tangible, non-transitory, computer-readable medium comprising computer-readable instructions to:
    store, in a tag object data store, tag object data of a tag object in one or more data fields defined by a data structure of measurement data acquired by a sensing component, wherein the tag object data comprises a first tag object and a second tag object, wherein the first tag object comprises an association with one or more first metadata fields, and the second tag object comprises an association with one or more second metadata fields;
    extend the data structure by associating metadata associated with the first tag object with the second tag object by:
        defining one or more metadata values that are not defined in the one or more second metadata fields based on a pass-through relationship between the first tag object and the second tag object; and
        storing the one or more metadata values in the one or more second metadata fields; and
    access at least a portion of both the tag object data and the metadata from the tag object data store by:
        providing a name reference that comprises a measurement data namespace, indicating a particular instance of the tag object and particular measurement data from the one or more data fields and a metadata namespace, indicating a particular field of metadata from the one or more metadata fields associated with the tag object data, wherein the name reference comprises a special identifier that separates the measurement data namespace from the metadata namespace and a second special identifier that separates the particular instance of the tag object from the particular measurement data; and in response to providing the name reference, receiving, from the tag object data store, measurement data and metadata identified by the name reference.

11. The tangible, non-transitory, computer-readable medium of claim 10, wherein the computer-readable instructions comprise instructions to determine whether the pass-through relationship exists between the first tag object and the second tag object:

before associating the metadata with the second tag object; and based on the first tag object and second tag object being configured using a same downloaded object type.

12. The tangible, non-transitory, computer-readable medium of claim 10, wherein the computer-readable instructions comprise instructions to determine whether the pass-through relationship exists:

before associating the metadata with the second tag object; and the first and second tag object being generated from a same type of data included in sensor data.

13. The tangible, non-transitory, computer-readable medium of claim 11, wherein the computer-readable instructions comprise instructions to set the one or more metadata values to be equivalent to one or more second metadata values associated with at least a portion of the one or more first metadata fields.

14. The tangible, non-transitory, computer-readable medium of claim 10, wherein the first tag object and second tag object are tags defined by a rigid data structure consisting of a name filed, a type field, a description field, and a value field without support for additional data; and the tag object data store comprises a tag database that stores the tags.

15. An electronic device, comprising:

a tag object data store; and a processor configured to:

acquire tag object data from one or more measurement devices in a format defined by a data structure;

store, in the tag object data store, the tag object data of a tag object in one or more tag object data fields defined by the data structure;

extend the data structure based on a pass-through relationship between the tag object and another tag object of the tag object data store;

extend the data structure by associating metadata with the tag object data;

identify an object type reference associating tag objects of a particular type to the metadata;

associate the tag objects of the particular type to the metadata based upon the object type reference; and access at least a portion of both the data and the metadata from the tag object data store by:

providing a name reference that comprises a measurement data namespace, indicating a particular instance of the tag object and particular measurement data from the one or more data fields and a metadata namespace, indicating a particular field of metadata from the metadata associated with the particular type to access, wherein the name reference comprises a special identifier that separates the measurement data namespace from the metadata namespace and a second special identifier that separates the particular instance of the tag object from the particular measurement data; and in response to providing the name reference, receiving, from the tag object data store, measurement data and metadata identified by the name reference.

16. The electronic device of claim 15, wherein:

the tag object data comprises one or more tags;

the tag object data store comprises a tag database configured to store the one or more tags in accordance with a ridged data structure consisting of a name field, a type field, a description field, and a value field without support for additional data; and the processor is configured to detect an absence of the one or more metadata values being defined in the tag database.

17. The electronic device of claim 15, wherein the special identifier is an @ symbol that separates the measurement data namespace from the metadata namespace, and wherein the second special identifier is a period that separates the particular instance of the tag object from the particular measurement data.

* * * * *